(12) United States Patent
Honma et al.

(10) Patent No.: US 7,956,515 B2
(45) Date of Patent: Jun. 7, 2011

(54) METHOD OF DRIVING A DRIVING APPARATUS CAPABLE OF SMOOTHLY MOVING A MOVING MEMBER

(75) Inventors: Toshihiko Honma, Yamagata (JP); Takahiro Suzuki, Sagae (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 0 days.

(21) Appl. No.: 12/546,831

(22) Filed: Aug. 25, 2009

(65) Prior Publication Data

US 2010/0052474 A1    Mar. 4, 2010

(30) Foreign Application Priority Data

Aug. 27, 2008  (JP) ................................. 2008-217611
Oct. 7, 2008   (JP) ................................. 2008-260852

(51) Int. Cl.
*H01L 41/08*         (2006.01)
(52) U.S. Cl. .................................. 310/323.02; 310/328
(58) Field of Classification Search .................. 310/317, 310/323.02; 318/116–118
See application file for complete search history.

(56) References Cited

U.S. PATENT DOCUMENTS

| 5,587,846 | A  | * | 12/1996 | Miyano et al. ................. | 359/824 |
| 5,589,723 | A  |   | 12/1996 | Yoshida et al. | |
| 6,803,699 | B2 |   | 10/2004 | Yuasa et al. | |
| 7,190,104 | B2 | * | 3/2007  | Yuasa ............................ | 310/317 |
| 7,268,465 | B2 |   | 9/2007  | Okamoto | |
| 7,457,060 | B2 |   | 11/2008 | Paik et al. | |
| 7,564,166 | B2 | * | 7/2009  | Onozuka et al. ............... | 310/317 |
| 7,567,012 | B2 | * | 7/2009  | Namikawa ...................... | 310/317 |
| 7,589,454 | B2 | * | 9/2009  | Onozuka et al. ............... | 310/317 |
| 7,679,264 | B2 | * | 3/2010  | Manabe et al. ........... | 310/323.02 |
| 2006/0082253 | A1 | * | 4/2006 | Hara ............................. | 310/317 |

FOREIGN PATENT DOCUMENTS

| JP | 3141714     | B2 | 12/2000 |
| JP | 3218851     | B2 | 8/2001  |
| JP | 2002119074  | A  | 4/2002  |
| JP | 3646154     | B2 | 2/2005  |
| JP | 2006-141133 | A  | 6/2006  |
| JP | 2006-304529 | A  | 11/2006 |
| JP | 2007-226234 | A  | 9/2007  |

* cited by examiner

*Primary Examiner* — Mark Budd
(74) *Attorney, Agent, or Firm* — Holtz, Holtz, Goodman & Chick, PC

(57) ABSTRACT

A driving method is for a driving apparatus including an electro-mechanical transducer having first and second end surfaces opposite to each other in an expansion/contraction direction, a vibration friction portion mounted to the second end surface of the electro-mechanical transducer, a moving member frictionally coupled to the vibration friction portion, and a vibration transfer member disposed between the second end surface of said electro-mechanical transducer and an end surface of said vibration friction portion, whereby moving the moving member in the expansion/contraction direction of the electro-mechanical transducer. The driving method includes subjecting the electro-mechanical transducer to reciprocating displacement in a sawtooth waveform and transferring the reciprocating displacement of the electro-mechanical transducer to the vibration friction portion through the vibration transfer member, thereby linearly driving the moving member in a predetermined direction.

10 Claims, 9 Drawing Sheets

FIG. 8A
FIG. 8B
FIG. 8C
WITHOUT VIBRATION TRANSFER MEMBER
FIG. 8D
WITH VIBRATION TRANSFER MEMBER
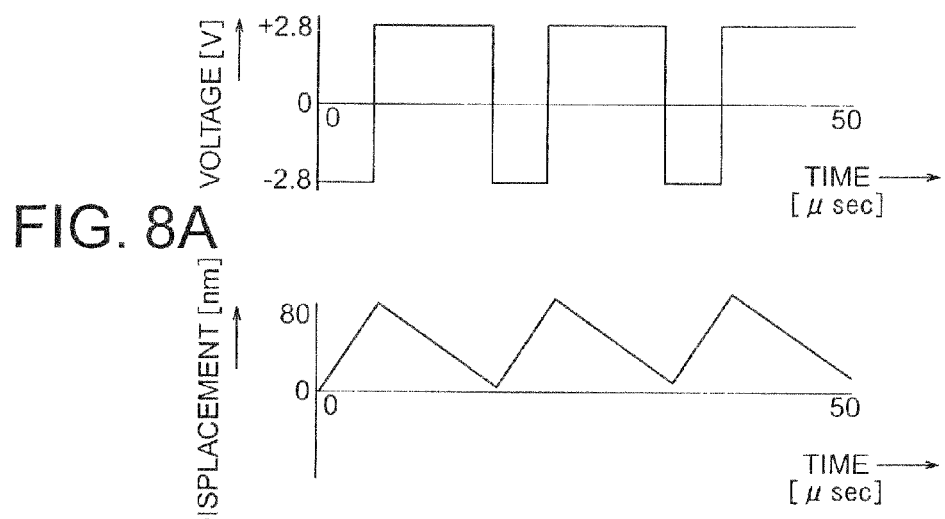
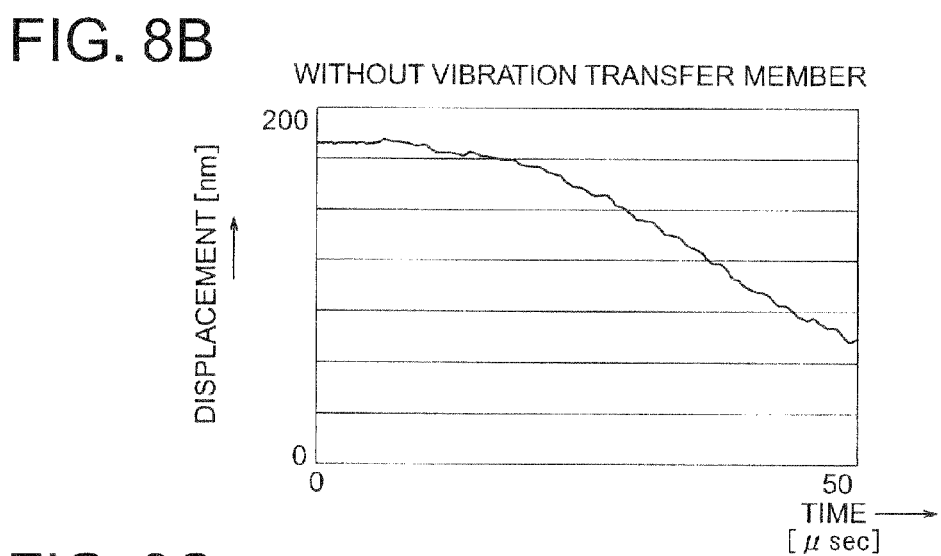
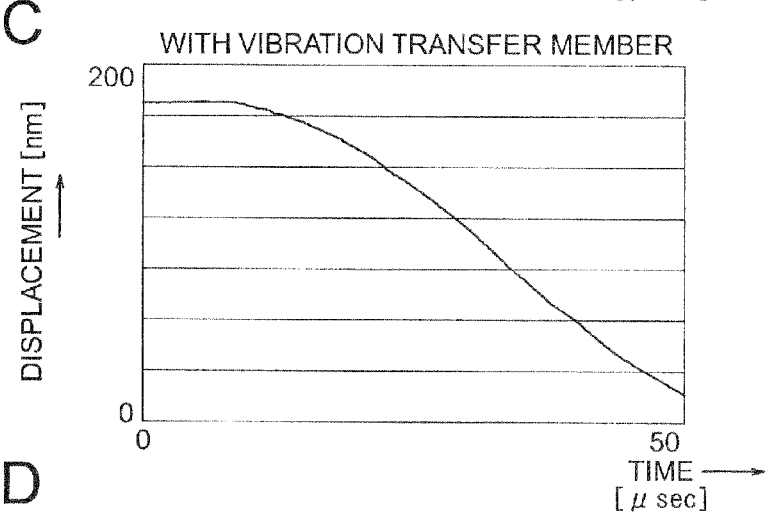

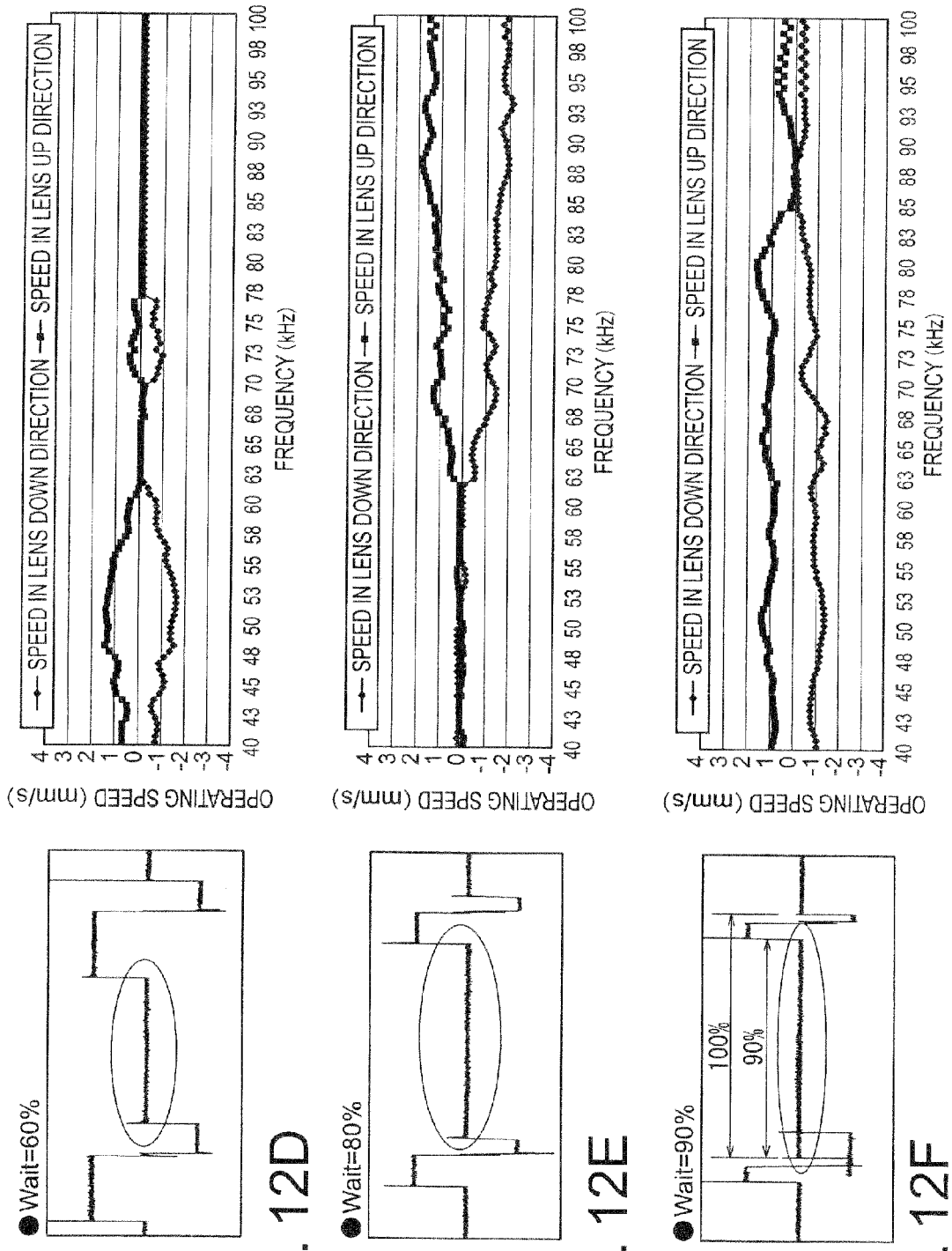

METHOD OF DRIVING A DRIVING APPARATUS CAPABLE OF SMOOTHLY MOVING A MOVING MEMBER

This application is based upon and claims the benefit of priority from Japanese Patent Applications Nos. JP 2008-217611, filed on Aug. 27, 2008, and JP 2008-260852, filed on Oct. 7, 2008, the disclosures of which are incorporated herein in their entirety by reference.

BACKGROUND OF THE INVENTION

This invention relates to a driving method for a driving apparatus and, in particular, to a driving method for driving the driving apparatus where an electro-mechanical transducer such a piezoelectric element is used as a driving source of the driving apparatus.

Previously, linear actuators (driving apparatuses) using electro-mechanical transducers such as piezoelectric elements, electrostrictive elements, magnetostrictive elements, or the like are used as auto-focus actuators or zoom actuators for use in cameras.

By way of illustration, Japanese Patent No. 3218851 (JP-B-3218851) (which will be also called a first patent document), which corresponds to U.S. Pat. No. 5,589,723, discloses a driving method for a driving apparatus using an electro-mechanical transducer, which is capable of suppressing a ringing vibration generated in the electro-mechanical transducer such as a piezoelectric element and which is capable of driving at a high speed. The driving apparatus disclosed in the first patent document comprises the electro-mechanical transducer such as a piezoelectric element, a driving member (a driving shaft), coupled to the transducer, for simultaneously making displacement therewith, and a driven member (a zoom lens barrel) frictionally coupled to the driving member. The driving apparatus in the first patent document drives the driven member (the zoom lens barrel) by devising a driving signal applied to the piezoelectric element (the electro-mechanical transducer).

The description will be made as regards the driving method for the driving apparatus disclosed in the first patent document in detail.

When a large current (in a positive or forward direction) and a constant current (in a negative or reverse direction) flow alternately through the piezoelectric element, the piezoelectric element produces alternately a rapid displacement (expansion) corresponding to the large current (positive or forward) and a slow displacement (contraction) corresponding to the constant current (negative or reverse).

It will now be assumed that the large current flows to the piezoelectric element in the positive or forward direction. In this event, the piezoelectric element rapidly produces the expansion displacement in the thickness direction. As a result, the driving member (the driving shaft) rapidly moves along the direction of the optical axis in a first direction. In this event, the driven member (the zoom lens barrel) does not move. This is because, caused by the inertial force, the driven member (the zoom lens barrel) substantially remains in its position by overcoming the friction force between the driving member (the driving shaft) and the driven member (the zoom lens barrel).

Subsequently, it will be assumed that the constant current flows the piezoelectric element in the negative or reverse direction. In this event, the piezoelectric element slowly produces the contraction displacement in the thickness direction. As a result, the driving member (the driving shaft) slowly moves along the direction of the optical axis in a second direction opposed to the first direction. In this event, the driven member (zoom lens barrel) substantially moves along the direction of the optical axis in the second direction together with the driving member (the driving shaft). This is because the driving member (the driving shaft) and the driven member (the zoom lens barrel) come into surface contact with each other and are coupled to each other due to the friction force generating in the contact surfaces.

In the manner which is described above, by alternately flowing the large current (the positive or forward direction) and the constant current (the negative or reverse direction) through the piezoelectric element to make the piezoelectric element alternately produce the expansion displacement and the contraction displacement, it is possible to continuously move the driven member (the zoom lens barrel) along the direction of the optical axis in the second direction.

It will be assumed that it makes the driven member (the zoom lens barrel) along the direction of the optical axis in the first direction. Conversely this is obtained by alternately flowing the large current (the negative or reverse direction) and the constant current (the positive or forward direction) through the piezoelectric element.

Inasmuch as a current supplied to the piezoelectric element is controlled, it is possible to suppress ringing vibration generated in the piezoelectric element and to drive the driven member at significantly higher velocities than before.

In addition, Japanese Unexamined Patent Application Publication No. 2006-304529 (JP-A-2006-304529) (which will be also called a second patent document) discloses a high-performance drive device whose cost and weight can be reduced in comparison with a structure with a metal material, and for which a moving member of high rigidity is used without deteriorating the speed of movement and a drive force. In the drive device disclosed in the second patent document, the moving member is formed with a liquid crystal polymer including carbon fibers. The drive device disclosed in the second patent document comprises a piezoelectric element (an electro-mechanical transducer) for expanding and contracting in response to an applied voltage, a drive shaft (a vibration friction portion) fixed to one end of the piezoelectric element in an expansion/contraction direction, the moving member (a moving portion) which is slidably and frictionally engaged with the drive shaft, and a weight (a stationary member) connected to another end of the piezoelectric element in the expansion/contraction direction. By vibrating the drive shaft by changing a speed or an acceleration of the piezoelectric element in the expansion/contraction direction, the drive device moves the moving member (the moving portion) along the drive shaft (the vibration friction portion).

The description will proceed to a driving method (operation) of the drive device disclosed in the second patent document.

A voltage applying apparatus applies, to the piezoelectric element (the electro-mechanical transducer), a driving pulse of a sawtooth waveform having a gentle leading edge portion and an abrupt falling edge portion. At the gentle leading edge portion of the driving pulse, the piezoelectric element gently produces expansion displacement in a thickness direction thereof and, with this expansion displacement, the drive shaft fixed to the piezoelectric element is gently displaced in an axial direction thereof. In this event, the moving member frictionally engaged with the drive shaft moves with the drive shaft due to a friction force. On the other hand, at the abrupt falling edge portion, the piezoelectric element abruptly produces contraction displacement in the thickness direction thereof and, with this contraction displacement, the drive shaft fixed to the piezoelectric element is abruptly displaced in the axial direction thereof. In this event, the moving member frictionally engaged with the drive shaft substantially remains in its position and does not move by overcoming a frictional coupling with the drive shaft due to an inertial force. By successively applying the driving pulse of the sawtooth waveform to the piezoelectric element, it is possible to move the moving member along the drive shaft in the direction away from the piezoelectric element. It will be assumed that it makes the moving member move in the opposite direction (i e nearer to the piezoelectric element). Conversely, this is obtained by changing a waveform of the sawtooth driving pulse applied to the piezoelectric element into one having an abrupt leading edge portion and a gentle falling edge portion because an inverse operation in the manner which is described above. In addition the driving pulse may have a rectangular wave or other waves.

Furthermore, Japanese Patent No. 3141714 (JP-B-3141714) (which will be also called a third patent document) which also corresponds to U.S. Pat. No. 5,589,723, discloses a driving apparatus which is capable of stably driving a moving member at a high speed. The driving apparatus disclosed in the third patent document comprises a stationary member, an electro-mechanical transducer having an end in an expansion/contraction direction that is connected to the stationary member, a driving member (a vibration friction portion) connected to another end of the electro-mechanical transducer in the expansion/contraction direction and supported thereto so as to enable to move in the expansion/contraction direction of the electro-mechanical transducer, a movable member frictionally coupled to the driving member and supported thereto so as to enable to move in the expansion/contraction direction of the electro-mechanical transducer, and a friction force giving arrangement for generating a friction force between the driving member (the vibration friction portion) and the movable member. The friction force giving arrangement comprises an elastic member, fixed to the movable member, for generating a pushing force and a sandwiching member, disposed between the elastic member and the driving member for transferring the pushing force to the driving member. In addition a contact portion between the movable member and the driving member and a contact portion between the movable member and the sandwiching member has a V shape in cross section.

In the driving apparatus disclosed in the third patent document, the movable member is driven by the driving method for the drive device disclosed in the second patent document.

Japanese Unexamined Patent Application Publication No. 2002-119074 (JP-A-2002-119074) (which will be also called a fourth patent document) discloses a driving device using an electro-mechanical transducer. The driving device disclosed in the fourth patent document comprises the electro-mechanical transducer having an end fixed to a supporting base (a stationary member), a vibrating member (a vibration friction portion) fixed to another end of the electro-mechanical transducer, and a movable body (a movable member) engaged with the vibrating member in a predetermined friction force. A carbon rod is used as the vibrating member (the vibration friction portion).

In the driving device disclosed in the fourth patent document also, the movable body is driven by the driving method for the drive device disclosed in the second patent document.

In addition, Japanese Unexamined Patent Application Publication No. 2006-141133 (JP-A-2006-141133) (which will be also called a fifth patent document), which corresponds to U.S. Pat. No. 7,268,465, discloses a driving device with a small overall length. The driving device disclosed in the fifth patent document comprises an electro-mechanical transducer having an end secured to a fixed body (a weight, a stationary member), a driving frictional member (a vibration friction portion) secured to anther end of the electro-mechanical transducer, and a moving body (a moving member) frictionally engaged with the driving frictional member. The driving frictional member is made of a material which is selected from a ceramic material, an engineering plastic such as polyphenylene sulfide resin (PPS resin) or a liquid crystal polymer (LCP resin), a carbon reinforced resin or glass fiber reinforced resin.

In the driving device disclosed in the fifth patent document also, the moving body is driven by the driving method for the drive device disclosed in the second patent document.

There are problems in the above-mentioned first through the fifth patent documents as follows.

In all of the driving devices (apparatuses) disclosed in the above-mentioned first through the fifth patent documents, the end surface of the electro-mechanical transducer and the end surface of the vibration friction portion (the vibration portion) are directly coupled to each other. It is necessary for the vibration friction portion to effectively transfer vibrations (reciprocating displacements) generated by expansion/contraction of the electro-mechanical transducer to the moving body (the moving member). However, in the driving method of the driving devices (apparatuses) disclosed in the first through the fifth patent documents, it is difficult to effectively transfer the vibrations (the reciprocating displacements) generated by the expansion/contraction of the electro-mechanical transducer to the moving body (the moving member). As a result, there is a problem that it is difficult to smoothly carry out moving (displacement) of the moving member.

Japanese Unexamined Patent Application Publication No. 2007-226234 (JP-A-2007-226234) (which will be also called a sixth patent document), which corresponds to U.S. Pat. No. 7,457,060, discloses a lens driving device which allows a simplified and miniaturized structure, a large transport range with low input power to achieve excellent resolution of positioning, minimal loss of driving power, simplified mechanism for guiding the transport of the lens, and accurate and stable transport of the lens. The lens driving device disclosed in the sixth patent document includes a lens barrel having a lens holder and an extension part extended from the lens holder. The lens driving device also includes a piezoelectric vibrator with a piezoelectric body flexed and bent in response to power application with a friction member in contact with the extension part, thereby providing driving power for transporting the lens barrel. The lens driving device further includes a preload member having a free end in resilient contact with a rear end of the piezoelectric body to compress the piezoelectric vibrator against the extension part and a guiding part for guiding the transport of the lens barrel in the optical axis direction.

The description will proceed to a driving method of the lens driving device disclosed in the sixth patent document.

As the piezoelectric vibrator is simultaneously driven by the longitudinal and bending modes at a resonance frequency of at least 20 kHz in an ultrasonic region, the friction member attached to an end of the piezoelectric body moves along an elliptical locus or path. The direction of the elliptical locus movement is determined by the resonant frequency determined by internal and external electrodes of the piezoelectric body, and this in turn enables adjustment of the transport direction of the lens. In response to selective power application, the piezoelectric body having a stack of multiple layers simultaneously performs the longitudinal (flexural) mode and the bending mode, and thus the friction member provided at one end of the piezoelectric body makes a linear motion in upward and downward directions. At this time, the direction of the bending mode vibration is congruent with the direction which the piezoelectric layers of the piezoelectric body are stacked and also coincides with the optical axis direction of an AF module. As the piezoelectric vibrator is fixed by the vertical rids to be prevented from rotational movement, the friction member make only vertical, back-and-forth linear movement, and the direction of the vibration locus is adjusted upward or downward in response to the resonance frequency applied to the piezoelectric body. Therefore, the friction member which makes only a vibration locus of vertical direction conveys the driving power via the friction member provided at the extension part of the lens barrel, which is the object of transport. Thus, the lens barrel is elevated or lowered in the optical axis direction along first and second guide rods of the guiding part.

The driving method of the lens driving device disclosed in the sixth patent document comprises the steps of simultaneously driving the piezoelectric vibrator by the longitudinal and bending modes, of moving the friction member attached to an end of the piezoelectric body along an elliptical locus or path, and of making the friction member only vertical, back-and-forth movement. Accordingly, there is a problem that it is complicate in structure of the piezoelectric body.

Japanese Patent No. 3646154 (JP-B-3646154) (which will be also called a seventh patent document), which corresponds to U.S. Pat. No. 6,803,699, discloses a drive mechanism which comprises a drive circuit employing a simple construction and achieving stable low-speed driving. The drive mechanism disclosed in the seventh patent document comprises an electromechanical transducer having a pair of ends in expanding and contracting direction, a drive member fixed to one of the ends of the electromechanical transducer, a driven member which contacts frictionally with the drive member under a predetermined frictional force exerted therebetween, and a drive circuit for applying a drive voltage to the electromechanical transducer. The drive circuit produces the drive voltage repeating a cycle of a first voltage having a first value which is one of a maximum value and a minimum value, a second voltage having a second value which is a value intermediate between the maximum value and the minimum value, and a third voltage having a third value having a value which is the other of the maximum value and the minimum value. The first voltage and the third voltage are equal in an absolute value and of opposite sign and the second voltage is zero volt.

In the drive mechanism disclosed in the seventh patent document also, the end surface of the electromechanical transducer in the expanding and contracting direction and the end surface of the drive member are directly coupled to each other. Accordingly, in the manner which is similar in the driving method of the driving devices (apparatuses) disclosed in the first through the fifth patent documents, it is difficult for the drive mechanism disclosed in the seventh patent document to effectively transfer the vibrations (the reciprocating displacements) generated by the expansion/contraction of the electromechanical transducer to the moving body (the moving member) As a result, there is a problem that it is difficult to smoothly carry out moving (displacement) of the moving member.

SUMMARY OF THE INVENTION

It is therefore an exemplary object of the present invention to provide a driving method for a driving apparatus which is capable of smoothly moving a moving member.

It is another exemplary object of the present invention to provide a driving method for a driving apparatus which is capable of effectively transferring reciprocating displacements generated by expansion/contraction of an electro-mechanical transducer to a moving member.

Other objects of this invention will become clear as the description proceeds.

On describing the gist of an exemplary aspect of this invention, it is possible to be understood that a driving method is for driving a driving apparatus which includes an electro-mechanical transducer having first and second end surfaces opposite to each other in an expansion/contraction direction, a vibration friction portion mounted to the second end surface of the electro-mechanical transducer, a moving member frictionally coupled to the vibration friction portion, and a vibration transfer member disposed between the second end surface of the electro-mechanical transducer and an end surface of the vibration friction portion. The moving method drives the moving member due to expansion/contraction of the electro-mechanical transducer so as to be movable the moving member in the expansion/contraction direction of the electro-mechanical transducer. According to the exemplary aspect of this invention, the driving method includes subjecting the electro-mechanical transducer to reciprocating displacement in a sawtooth waveform, and transferring the reciprocating displacement of the electro-mechanical transducer to the vibration friction portion through the vibration transfer member, thereby linearly driving the moving member in a predetermined direction.

BRIEF DESCRIPTION OF THE DRAWING

FIGS. 8A through 8D are waveform charts for use in describing the driving method for the driving apparatus according to a first exemplary embodiment of the present invention;

FIGS. 12A through 12F are views showing relationships between a frequency and an operating speed when a waiting time interval of a waiting or standby voltage is changed.

DESCRIPTION OF THE PREFERRED EMBODIMENTS

Figure 1:
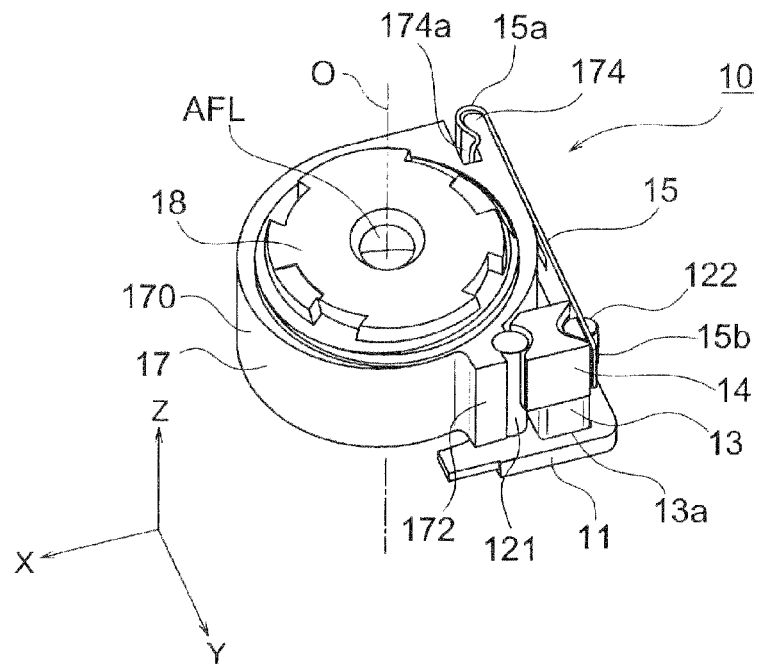
FIG. 1 is an external perspective view showing a first example of a driving apparatus to which a driving method according to this invention is applicable.
Figure 2:
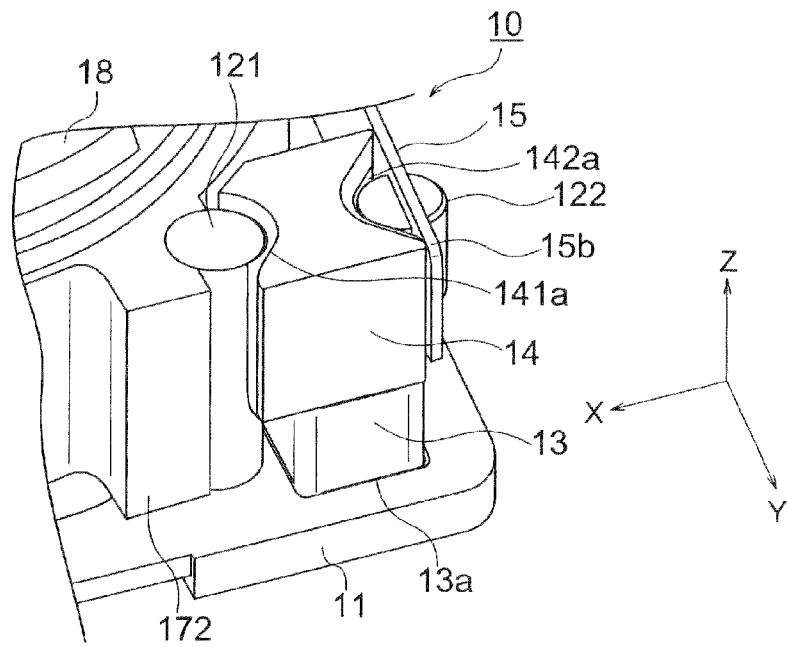
FIG. 2 is a fragmentary perspective view, on an enlarged scale, of a main portion of the driving apparatus illustrated in FIG. 1.
Figure 3:
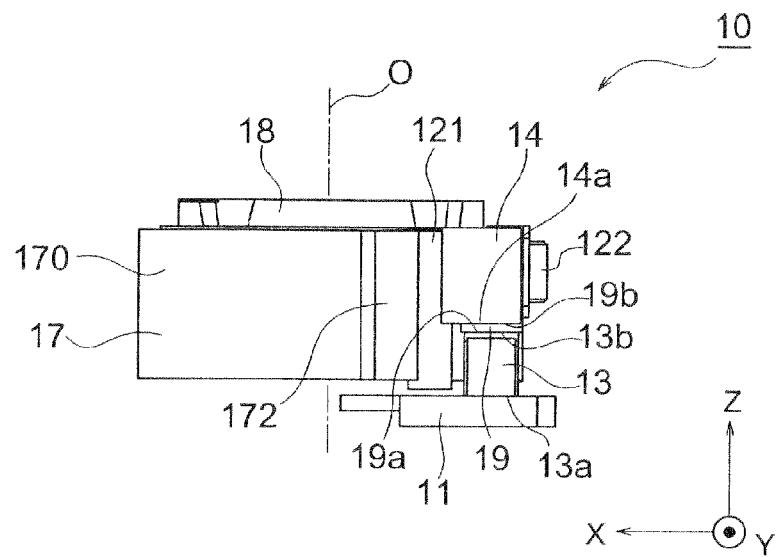
FIG. 3 is a side view of the driving apparatus illustrated in FIG. 1.
Figure 4:
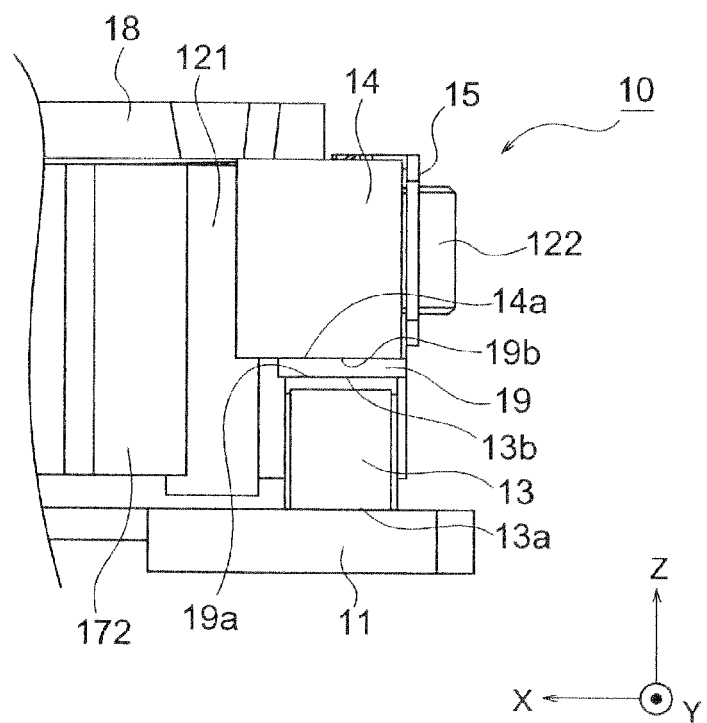
FIG. 4 is a fragmentary side view, on an enlarged scale, of a main portion of the driving apparatus Illustrated in FIG. 3.

Referring to FIGS. 1 through 4, the description will proceed to a first example of a driving apparatus 10 to which a driving method according to this invention is applicable. FIG. 1 is a perspective view of the driving apparatus 10. FIG. 2 is a fragmentary perspective view, on an enlarged scale, of a main portion of the driving apparatus 10 illustrated in FIG. 1. FIG. 3 is a side view of the driving apparatus 10. FIG. 4 is a fragmentary side view, on an enlarged scale, of a main portion of the driving apparatus 10 illustrated in FIG. 3.

Herein, in the manner shown in FIGS. 1 to 4, an orthogonal coordinate system (X, Y, Z) is used. In a state illustrated in FIGS. 1 to 4, in the orthogonal coordinate system (X,Y, X), an X-axis direction is a fore-and-aft direction (a depth direction), a Y-axis direction is a left-and-right direction (a width direction), and a Z-axis direction is an up-and-down direction (a height direction).

The illustrated driving apparatus 10 is used, for example, as a lens driving portion for an auto-focus lens driving unit. In this event, in the example being illustrated in FIGS. 1 to 4, the up-and-down direction Z is a direction of an optical axis O of a lens.

In addition, the auto-focus lens driving unit comprises a lens movable portion and the lens driving portion. The lens driving portion slidably supports the lens movable portion in the direction of the optical axis O and drives the lens movable portion in the manner which will later be described.

The illustrated driving apparatus 10 is disposed in a cabinet (not shown). The cabinet includes a cap-shaped upper cover (not shown) and a lower base (not shown). On the lower base of the cabinet, a stationary member (a weight) 11 which will later be described is mounted The upper cover has an upper surface comprising a cylinder portion (not shown) having a center axis which is the optical axis O.

On the other hand, although illustration is not made, the lower base has a central portion in which an image pickup device disposed on a substrate is mounted The image pickup device picks up a subject image formed by an movable lens (which will later be described) to convert it into an electric signal. The image pickup device may, for example, comprise a CCD (charge coupled device) type image sensor, a CMOS (complementary metal oxide semiconductor) type image sensor, or the like.

In the cabinet, a movable barrel (a lens holder) 17 serving as a driven member is accommodated. The movable barrel (the lens holder a lens supporting body) 17 comprises a cylindrical tubular portion 170 for holding a lens barrel (a lens assembly) 18. The lens barrel (the lens assembly) 18 holds an auto-focus lens AFL which serves as the movable lens. The tubular portion 170 of the lens holder 17 has an inner wall on which a female thread (not shown) is cut. On the other hand, the lens barrel 18 has an outer wall on which a male thread (not shown) screwed in the female thread is cut Accordingly on mounting the lens barrel 18 in the lens holder 17, the lens barrel 18 is screwed in the tubular portion 170 of the lens holder 17 along the direction of the optical axis O by rotating the lens barrel 18 to the tubular portion 170 of the lens holder 17 around the optical axis O the lens barrel 18 is accommodated in the lens holder 17, and they are joined to each other by an adhesive or the like.

The lens holder 17 comprises a convex thread 172 which projects with respect to the optical axis O at a right side of the left-and-right direction Y of the tubular portion 170 outward in a radial direction. The convex thread 172 extends in parallel with the optical axis O in the up-and-down direction Z. The convex thread 172 has a rear wall on which a rod-shaped first moving body (a moving shaft) 121 is fixed. In the example being illustrated, the first moving body 121 has a cylindrical shape.

The lens holder 17 comprises an extending portion 174 which extends at a rear side of the tubular portion 170 leftward of the left-and-right direction Y The extending portion 174 has an engaging slot 174a for holding a first end portion 15a of a spring 15. The spring 15 extends along the extending portion 174 from the first end portion 15a to a second end portion 15b rightward of the left-and-right direction Y To the second end portion 15b of the spring 15, a rod-shaped second moving body (a moving shaft) 122 is mounted. In the example being illustrated, the second moving body 122 also has a cylindrical shape like as the first moving body 121.

The second moving body (moving shaft) 122 is urged nearer to the first moving body (moving shaft) 121 (forward of the fore-and-aft direction X by the spring 15. Between the first moving body (moving shaft) 121 and the second moving body (moving shaft) 122, a vibration friction portion (vibration member) 14 which will later be described is sandwiched at first and second friction surfaces 141 and 142 thereof. The first and the second friction surfaces 141 and 142 are opposed to each other in a direction orthogonal to the direction of the optical axis O. In other words, the first and the second friction surfaces 141 and 142 are opposed to each other in a direction orthogonal to an expansion/contraction direction of a laminated piezoelectric element 13 which will later be described.

In the example being illustrated, the first moving body 121 has a length which is longer than that of the second moving body 122. In addition, the first moving body 121 and the second moving body 122 are made of the same material. A combination of the first moving body 121 and the second moving body 122 serves as a moving member.

A combination of the movable barrel (the lens holder) 17, the lens barrel (the lens assembly) 18, the spring 15, and the first and the second moving bodies 121 and 122 is composed of the lens movable portion of the auto-focus lens driving unit. In the manner which will later be described at least one of the first and the second friction surfaces 141 and 142 of the vibration friction portion 14 has a V-shaped groove in cross section. With this structure, it is possible to linearly move the lens movable portion with respect to the cabinet in the direction of the optical axis O alone without providing with any special (special-purpose) guide member. Accordingly, the guide member becomes unnecessary like as the driving apparatuses disclosed in the above-mentioned first through the sixth patent documents.

New, the description will proceed to the lens driving portion of the auto-focus lens driving unit. The lens driving portion (the driving apparatus) comprises a laminated piezoelectric element 13 serving as an electro-mechanical transducer the above-mentioned stationary member (the weight) 11, the above-mentioned vibration friction portion (the vibration member) 14, and a vibration transfer member 19.

The laminated piezoelectric element 13 expands and contracts in a direction of the optical axis O. The laminated piezoelectric element 13 has a structure where a plurality of piezoelectric layers are laminated in the direction of the optical axis O. As shown in FIG. 4, the laminated piezoelectric element 13 has a first end portion (a lower end portion) 13a and a second end portion (an upper end portion) 13b which are opposed to each other in the expansion/contraction direction. The stationary member (the weight) 11 is coupled to the first end portion (the lower end portion) 13a of the laminated piezoelectric element 13 using an adhesive agent or the like.

A combination of the laminated piezoelectric element 13 and the static member 11 is called a piezoelectric unit.

The vibration friction portion (the vibration member) 14 is mounted to the second end portion (the upper end portion) 13b of the laminated piezoelectric element 13 using the adhesive agent or the like via the vibration transfer member 19. That is, the upper end portion 13b of the laminated piezoelectric element 13 is coupled to a lower end surface 19a of the vibration transfer member 19 using the adhesive agent (adhesive resin) while a lower end surface 14s of the vibration friction portion (the vibration member) 14 is coupled to an upper end surface 19b of the vibration transfer member 19 using the adhesive agent (the adhesive resin).

In the manner which is described above, inasmuch as the vibration transfer member 19 is added (inserted) between the vibration friction portion (the vibration member) 14 and the laminated piezoelectric element (the electro-mechanical transducer) 13, the vibration friction portion (the vibration member) 14 merely may have structure in view of only slidableness to the first and the second moving body 121 and 122. Therefore, it is unnecessary for the vibration friction portion (the vibration member) 14 to select a material thereof in view of resin adherability of the electro-mechanical transducer (the laminated piezoelectric element) 13. Accordingly, the vibration friction portion (the vibration member) 14 increases a degree of flexibility in shape thereof as well as a degree of flexibility in selection of the material thereof. In the example being illustrated, as the material of the vibration friction portion (the vibration member) 14, aluminum having a surface given fluorine-lubricating plating is used. As the material of the vibration transfer member 19, iron alloy (cold-reduced carbon steel (SPCC), stainless steel (SUS), or the like) is used.

In addition, it is possible to reduce resonance phenomenon of the spring 15 by adding the vibration transfer member 19 and by matching the material and the shape thereof with other members. Furthermore, it is possible to compensate unevenness in performance each product causing by unevenness in dimension of the spring 15 by using the vibration transfer member 19 having a relatively simple shape. In other words, it is possible to limit the unevenness in performance each product of the driving apparatus 10 because the vibration transfer member 19 can be manufactured in simple shape.

Furthermore, by adding the vibration transfer member 19, it is possible to effectively transfer vibrations (reciprocating displacements) generating by expansion/contraction of the electro-mechanical transducer (the laminated piezoelectric element) 13 to the moving member (121, 122) in the manner which will later be described. As a result it is possible to smoothly carry out the moving (the displacement) of the moving member (121, 122).

Figure 5:
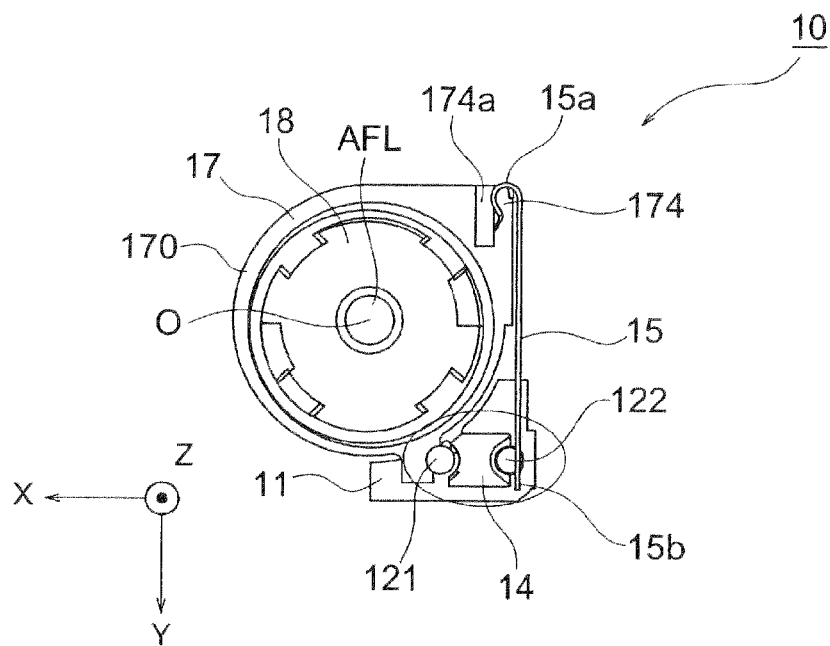
FIG. 5 is a plan view of the driving apparatus illustrated in FIG. 1.
Figure 6:
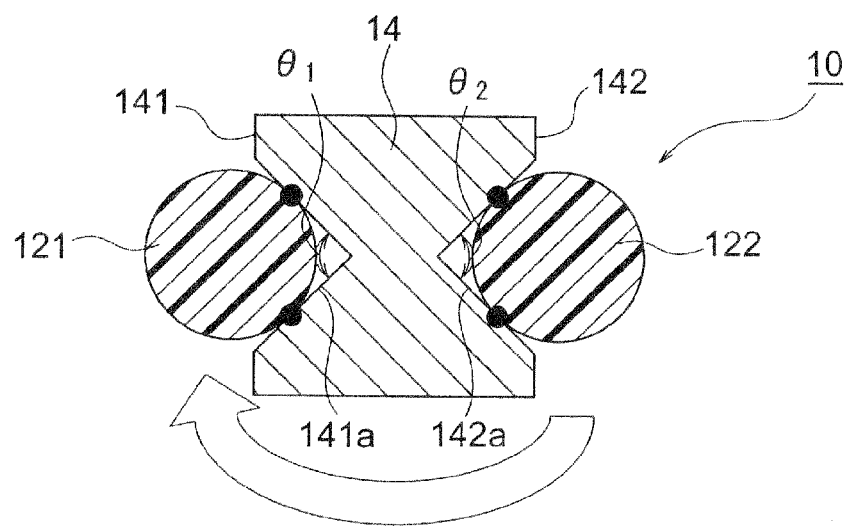
FIG. 6 is a fragmentary sectional view, on an enlarged scale, of a portion enclosed in an ellipse of FIG. 5.

Referring to FIGS. 5 and 6, description will be made as regards the relationship between the vibration friction portion 14 and the first and the second moving bodies 121 and 122 in detail. FIG. 5 is a plan view of the driving apparatus 10. FIG. 6 is a fragmentary sectional view, on an enlarged scale, of a portion enclosed in an ellipse of FIG. 5.

The rod-shaped first and second moving shafts 121 and 122 are frictionally coupled to the vibration friction portion (the vibration member) 14. The vibration friction portion (the vibration member) 14 has a first groove 141a at a front end in the fore-and-aft direction X that is a V-shape in cross section at the first friction coupling portion (the first friction surface) 141 between the vibration friction portion 14 and the rod-shaped first moving shaft 121 and has a second groove 142a at a rear end in the fore-and-aft direction X that is a V-shape in cross section at the second friction coupling portion (the first friction surface) 142 between the vibration friction portion 14 and the rod-shaped second moving shaft 122.

In the manner which is described above, the lens movable portion comprises the spring 15 for sandwiching the vibration friction portion (the vibration member) 14 between the rod-shaped first and second moving bodies (moving shafts) 121 and 122. That is, the spring 15 has the first end portion 15a held in the engaging slot 174a and generates a pressing force for pressing the vibration friction portion (the vibration member) 14 towards the first moving body (moving shaft) 121 by the second moving body (moving shaft) 122 mounted to the second end portion 15b thereof. In other words, the spring 15 serves as a friction force adding arrangement (an urging arrangement) for adding a friction force between the vibration friction portion (the vibration member) 14 and the first and the second moving bodies 121 and 122 by urging the second moving body (moving shaft) 122 against the vibration friction portion (the vibration member) 14 to sandwich the vibration friction portion (the vibration member) 14 between the first and the second moving bodies 121 and 122.

In the manner which is described above, inasmuch as the vibration friction portion (the vibration member) 14 is sandwiched between the first and the second moving bodies 121 and 122 at both end surfaces thereof (the first groove 141a formed in the first friction surface 141 and the second groove 142a formed in the second friction surface 142), it is possible to restrict a position of the lens movable portion and it is possible to prevent the lens movable portion from rotating around the first moving body 121. That is, it is possible to prevent the lens holder 17 serving as the driven member from rotating around the first moving body 121 as shown in an arrow of FIG. 6 without using any special (special-purpose) guide member.

In addition, in the example being illustrated, the first moving body 121 and the second moving body 122 are made of the same material. It is therefore possible to substantially make equal a first coefficient of friction between the first moving body 121 and the first friction surface 141 of the vibration friction portion 14 and a second coefficient of friction between the second moving body 122 and the second friction surface 142 of the vibration friction portion 14. As a result, as shown in FIG. 6, it is possible to substantially make equal a first friction force acting at contact lines (two black circular points of left side in FIG. 6) between the first moving body 121 and the first friction surface 141 of the vibration friction portion 14 and a second friction force acting at contact lines (two black circular points of right side in FIG. 6) between the second moving body 122 and the second friction surface 142 of the vibration friction portion 14. Thus, it is possible to linearly drive the lens movable portion with stability. As a result, it is possible to effectively transfer the vibration movement generating by the expansion/contraction of the laminated piezoelectric element (the electro-mechanical transducer) 13 to the first and the second moving bodies 121 and 122.

In the vibration friction portion 14, the first frictionally coupled portion (the first friction surface) 141 between the vibration friction portion 14 and the first moving body 121 has the first V-shaped groove 141a in cross section. Inasmuch as the first V-shaped groove 141a of the vibration friction portion 14 and the first moving body 121 come in contact with each other in line contact of two straight liens, advantages according to the driving apparatus 10 are that the first frictionally coupled portion (the first friction surface) 141 is put into a stable contact state to obtain friction driving having good reproducibility, and it is possible to enhance rectilinear mobility of the first moving body 121 as a single-shaft mobile unit. In addition, it is desirable that the first V-shaped groove 141a of the vibration friction portion 14 has a first angle θ1 which lies in a range of 30 degrees, inclusive, to 180 degrees, exclusive.

Likewise, in the vibration friction portion 14, the second frictionally coupled portion (the second friction surface) 142 between the vibration friction portion 14 and the second moving body 122 has the second V-shaped groove 142a in cross section. Inasmuch as the second V-shaped groove 142a of the vibration friction portion 14 and the second moving body 122 come in contact with each other in line contact of two straight liens, advantages according to the driving apparatus 10 are that the second frictionally coupled portion (the second friction surface) 142 is put into a stable contact state to obtain friction driving having good reproducibility, and it is possible to enhance rectilinear mobility of the second moving body 122 as the single-shaft mobile unit. In addition, it is desirable that the second V-shaped groove 142a of the vibration friction portion 14 has a second angle θ2 which lies in a range of 30 degrees inclusive, to 180 degrees, exclusive.

In addition, the first and the second moving bodies 121 and 122 are pressed against the vibration friction portion 14 by the spring 15. As a result of this, inasmuch as the first and the second moving bodies 121 and 122 are pressed against the first V-shaped groove 141a and the second V-shaped groove 142a of the vibration friction portion 14, respectively, it is possible to make three parts (the first and the second moving bodies 121 and 122, and the vibration friction portion 14) stable four lines contact.

Figure 7:
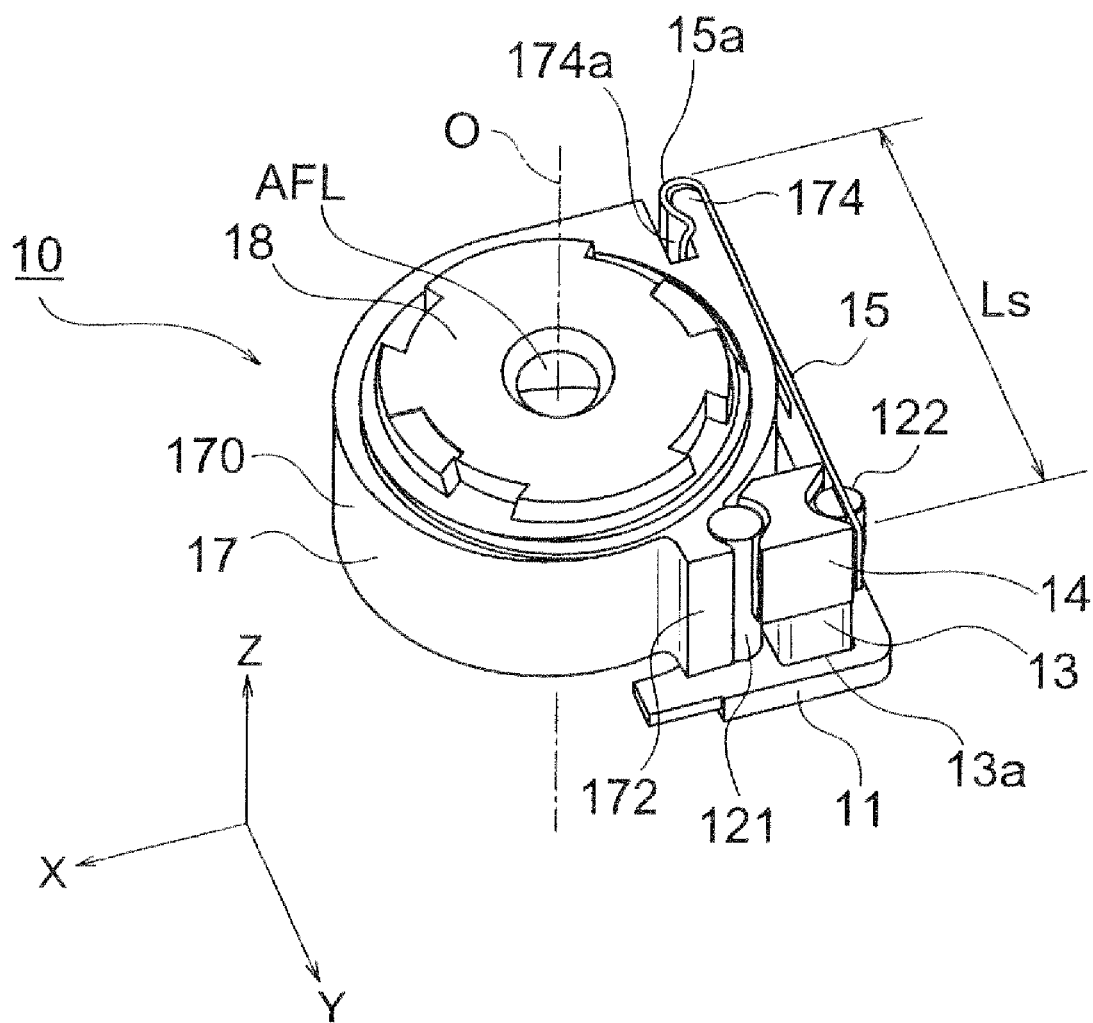
FIG. 7 is a perspective view of the driving apparatus illustrated in FIG. 1 for use in describing an effective length of a spring.

Referring to FIG. 7, the description will proceed to an effective length Ls of the spring 15. FIG. 7 is a perspective view of the driving apparatus 10 illustrated in FIG. 1. As shown in FIG. 7, it is possible for the driving apparatus 10 to design the effective length Ls of the spring 15 so as to make it longer. Therefore, it is possible to have little effect on a load although the spring 15 varies in dimensions and assembled dimensions thereof. As a result, it is possible to manufacture the drive apparatus 10 with variations in performance each product reduced.

Inasmuch as it is possible to design the effective length Ls of the spring 15 so as to make it longer in the manner which is described above, it is possible to give full play to elastic effect although the spring 15 is made not only of metal but also of a resin molded article.

In addition, the spring 15 is not mounted to the vibration friction portion 13 but is mounted to the lens movable portion. Inasmuch as the vibration friction portion 13 and the spring 13 are separated from each other in the manner which has been described above, it is possible to prevent occurrence of a resonance phenomenon of the spring 15. Accordingly, the vibration friction portion 13 and the spring 15 do not invert in phase and it is possible to effectively move the lens movable portion. In addition, it is possible to control the direction of travel of the lens movable portion so as to travel in the direction as intended.

The lens driving portion and the lens movable portion are disposed in parallel with each other in the optical axis O as shown in FIG. 1. Accordingly, it is possible to lower a height of the driving apparatus 10.

In addition, in the example being illustrated, the length of the first moving body 121 is longer than that of the second moving body 122. This reason is as follows. The first moving body 121 makes the length thereof longer in order to frictionally couple to the vibration friction portion 14 with stability. On the other hand, the second moving body 122 makes the length thereof shorter because the second moving body 122 plays an ancillary role in stably driving the driving apparatus 10. It is therefore possible to achieve miniaturization and shortening of the driving apparatus 10.

Referring now to FIGS. 8A through 8D, the description will proceed to a driving method according to a first exemplary embodiment of this invention. FIGS. 8A and 8B show variations in a driving voltage applied to the laminated piezoelectric element 13 by a driving circuit (not shown) and displacements of the laminated piezoelectric element 13, respectively. FIG. 8C is a view showing displacements of the moving member (121, 122) in a case where there is no vibration transfer member 19 (in a conventional driving apparatus) while FIG. 8D is a view showing displacements of the moving member (121, 122) in a case where there is the vibration transfer member 19 (in the driving apparatus according to this invention). In FIGS. 8A to 8D, the abscissa represents a time [μsec]. In FIG. 8A, the ordinate represents a voltage [V]. In each of FIGS. 8B to 8D, the ordinate represents the displacement [nm].

As shown in FIG. 8A, the laminated piezoelectric element 13 is applied with, as the driving voltage, a rectangular wave voltage consisting of a repetition wave of a negative voltage and a positive voltage. In the example being illustrated, the negative voltage is equal to −2.8 volts while the positive voltage is equal to +2.8 volts. The rectangular wave voltage has a driving frequency of 96 kHz and has a duty factor of 30/70, In the example being illustrated, the duty factor is the ratio of a pulse width of the negative voltage to a pulse width of the positive voltage. In addition, the illustrated example shows an example to make the lens holder 17 (the lens barrel 18) continuously move along the direction of the optical axis O (the up-and-down direction Z) downwards.

Under the circumstances, the laminated piezoelectric element 13 produces alternately a rapid displacement (expansion) corresponding to the negative voltage having the short pulse width and a slow displacement (contraction) corresponding to the positive voltage having the long pulse width, as shown in FIG. 8B.

That is, by applying the rectangular wave voltage (the driving voltage) to the laminated piezoelectric element 13 (FIG. 8A), it makes the laminated piezoelectric element 13 produce sawtooth displacements (expansion and contraction) (FIG. 8B).

Referring to FIG. 1 in addition to FIGS. 8A to 8D, the description will be made as regards operation of the driving apparatus 10. First, the description will presently be made as regards operation in a case where the lens movable portion moves along the up-and-down direction Z downwards.

It will now be assumed that the negative voltage having the short pulse width is applied to the laminated piezoelectric element 13 as shown in FIG. 8A. In this event, the laminated piezoelectric element 13 rapidly produces the expansion displacement in the thickness direction as shown in FIG. 8B. As a result, the vibration friction portion 14 rapidly moves via the vibration transfer member 19 along the direction of the optical axis O (the up-and-down direction Z) upwards. In this event, the lens movable portion (the first and the second moving bodies 121 and 122) does not move. This is because, caused by the inertial force, the lens movable portion (the first and the second moving bodies 121 and 122) substantially remains in its position by overcoming the friction force between the vibration friction portion 14 and the rod-shaped first and second moving bodies 121 and 122.

Subsequently, it will be assumed that the positive voltage having the long pulse width is applied to the laminated piezoelectric element 13 as shown in FIG. 8A. In this event, the laminated piezoelectric element 13 slowly produces the contraction displacement in the thickness direction as shown in FIG. 8B. As a result, the vibration friction portion 14 slowly moves via the vibration transfer member 19 along the direction of the optical axis O (the up-and-down direction Z) downwards In this event, the lens movable portion (the first and the second moving bodies 121 and 122) substantially moves along the direction of the optical axis O (the up-and-down direction Z) downwards together with the vibration friction portion 14. This is because the vibration friction portion 14 and the rod-shaped first and second moving bodies 121 and 122 come into surface contact with each other and are coupled to each other due to the friction force generating in the contact surfaces (the first and the second friction surfaces 141 and 142).

In the manner which is described above, by alternately applying the negative voltage having the short pulse width and the positive voltage having the long pulse width to the laminated piezoelectric element 13 to make the laminated piezoelectric element 13 alternately produce the expansion displacement and the contraction displacement, it is possible to continuously move the lens holder 17 (the lens barrel 18) along the direction of the optical axis O (the up-and-down direction Z) downwards.

At this point, in the conventional driving apparatus wherein there is no vibration transfer member 19, the reciprocating displacements (vibrations) of the laminated piezoelectric element (the electro-mechanical transducer) 13 are directly transferred to the vibration friction portion 14. It is therefore difficult to effectively transfer the vibrations (the reciprocating displacements) generating by the expansion/contraction of the laminated piezoelectric element (the electro-mechanical transducer) 13 to the moving member (121 and 122). As a result, it is impossible to smoothly move the lens movable portion (the moving member), as shown in FIG. 8C.

On the other hand, in the driving apparatus 10 according this embodiment wherein there is the vibration transfer member 19, the reciprocating displacements (vibrations) of the laminated piezoelectric element (the electro-mechanical transducer) 13 is transferred via the vibration transfer member 19 to the vibration friction portion 14. It is therefore possible to effectively transfer the vibrations (the reciprocating displacements) generating by the expansion/contraction of the laminated piezoelectric element (the electro-mechanical transducer) 13 to the moving member (121 and 122). As a result, it is possible to smoothly move the lens movable portion (the moving member), as shown in FIG. 8D.

In the manner which is described above, by subjecting the electro-mechanical transducer 13 to reciprocating displacement in a sawtooth waveform to transfer the reciprocating displacement of the electro-mechanical transducer 13 to the vibration friction portion 14 through the vibration transfer member 19, it is possible to linearly drive the moving member (121, 122) in a predetermined direction (downwards in the example being illustrated) smoothly.

It will be assumed that it makes the lens movable portion along the direction of the optical axis O (the up-and-down direction Z) upwards. Conversely, this is obtained by alternately applying the negative voltage having a long pulse width and the positive voltage having a short pulse width to the laminated piezoelectric element 13.

In addition, in the above-mentioned first exemplary embodiment, the description is exemplified in a case where the duty factor of the rectangular wave voltage (i.e. the ratio of the pulse width of the positive voltage to the pulse width of the negative voltage or the ratio of the pulse width of the negative voltage to the pulse width of the positive voltage) is 70/30, However, the present inventor experimentally ascertained that it is possible smoothly move the lens movable portion (the moving member) when the duty ratio lies in a range between 75/25 and 65/35.

Furthermore, although the electro-mechanical transducer 13 is subjected to the reciprocating displacements in the sawtooth by applying the rectangular wave voltage to the electro-mechanical transducer 13 in the above-mentioned first exemplary embodiment, as a matter of course, a method of making the electro-mechanical transducer 13 produce the reciprocating displacements in the sawtooth is not limited to this.

Moreover, in the above-mentioned first exemplary embodiment, the moving member (121, 122) is linearly moved in the predetermined direction by repeating the moving member (121, 122) with respect to the vibration friction portion 14 to put into a non-slip state and a slip state In other words, the driving apparatus 10 is driven so as to produce the slip between the vibration friction portion 14 and the moving member (121, 122) at one of on the expansion and on contraction of the electro-mechanical transducer 13 and so as to do not produce the slip between the vibration friction portion 14 and the moving member (121, 122) at the other of on the expansion and on the contraction of the electro-mechanical transducer 13. Such a driving method is called in this technical field a non-slip/slip driving method.

However, the moving member (121, 122) may be linearly moved in the predetermined direction by repeating the moving member (121, 122) with respect to the vibration friction portion 14 to put into the slip state. In other words, the driving apparatus 10 may be driven so as to produce the slip between the vibration friction portion 14 and the moving member (121, 122) at both of on the expansion and on the contraction of the electro-mechanical transducer 13. Such a driving method is called in this technical field a slip/slip driving method.

Now, the description will proceed to the laminated piezoelectric element 13. The laminated piezoelectric element 13 has a rectangular parallelepiped shape having an element size of 0.9 mm×0.9 mm×1.5 mm. The piezoelectric material is made of a material having a low Qm such as lead-zirconate-titanate (PZT). The laminated piezoelectric element 13 is manufactured by alternately laminating the piezoelectric materials each having a thickness of 20 microns and the internal electrodes each having a thickness of 2 microns in a corn fashion by fifty layers. In addition, the laminated piezoelectric element 13 has the effective internal electrode size of 0.6 mm×0.6 mm. In other wards, at a peripheral portion positioned the outside of the effective internal electrode of the laminated piezoelectric element 13, there is a ring-shaped dead area (clearance) of a width of 0.15 mm.

Figure 9:
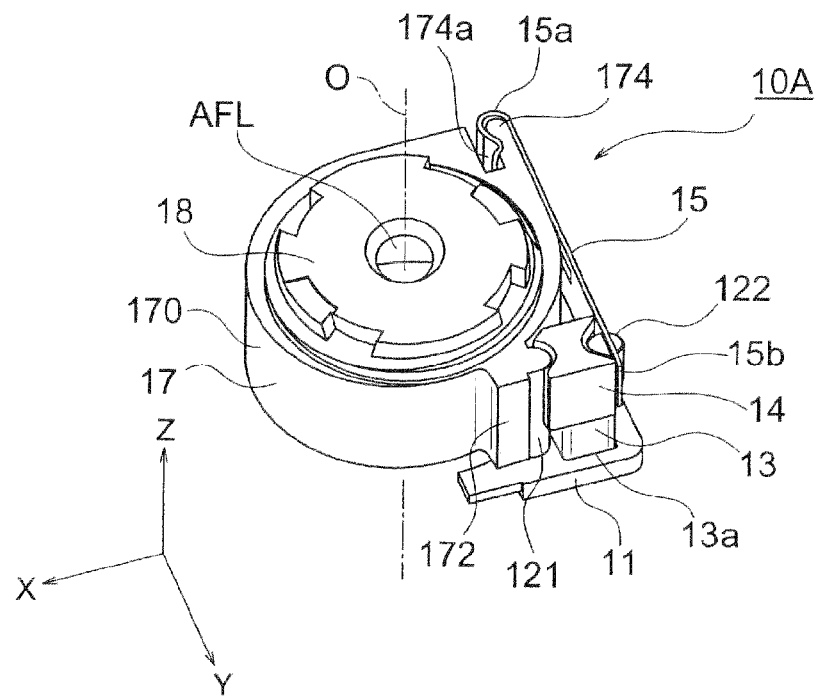
FIG. 9 is a perspective view showing a modified example of the driving apparatus illustrated in FIG. 1.
Figure 10:
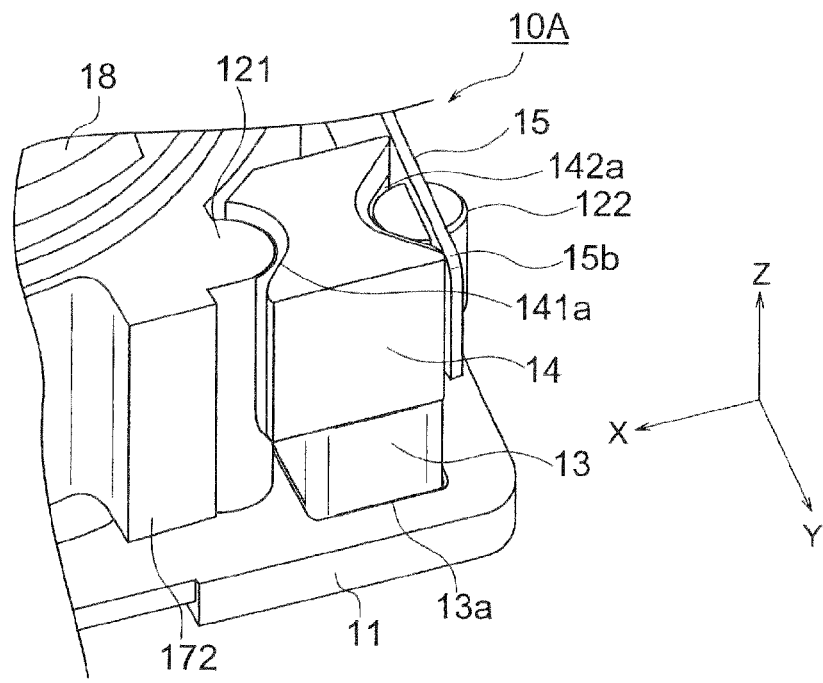
FIG. 10 is a fragmentary perspective view, on an enlarged scale, of a main portion of the driving apparatus illustrated in FIG. 9.

Although the first moving body 121 and the movable barrel (the lens holder, the lens supporting body) 17 are constructed by separated bodies and are fixed to each other in the driving apparatus 10 illustrated in FIGS. 1 to 7, the first moving body 121 and the movable barrel (the lens holder, the lens supporting body) 17 may be constructed by a one-piece in the manner as a driving apparatus 10A illustrated in FIGS. 9 and 10. In this event, the movable barrel (the lens holder, the lens supporting body) 17 and the first moving body 122 are made of the same material.

Figure 11:
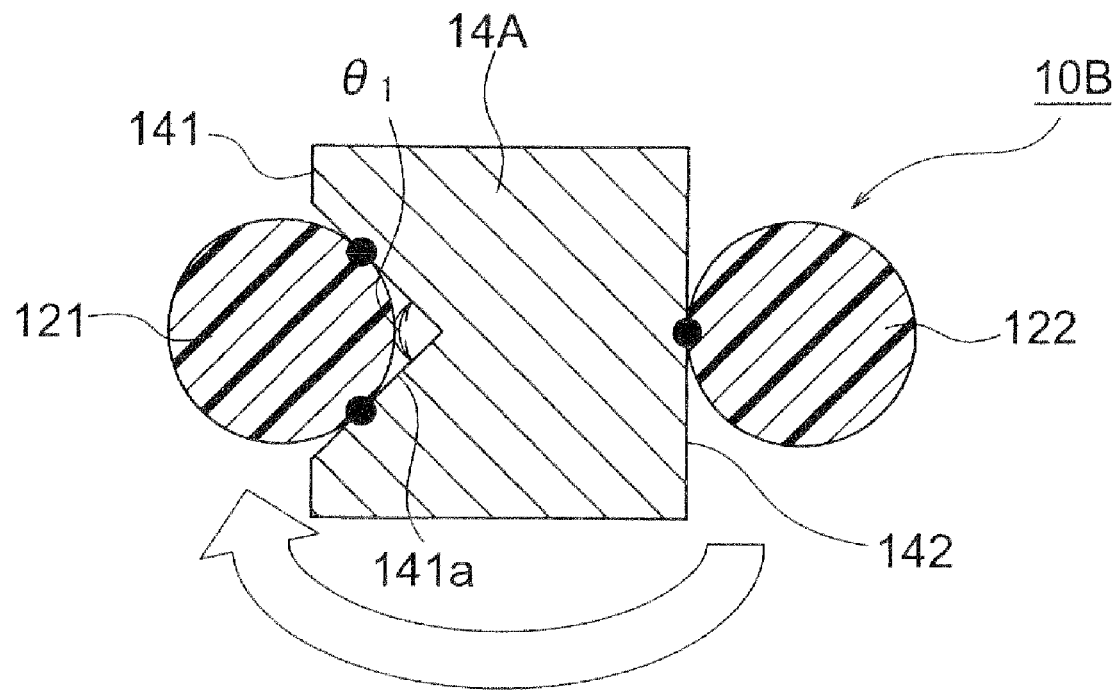
FIG. 11 is a plan sectional view showing a placement relationship between a vibration friction portion and first and second moving bodies for use in a second example of a driving apparatus to which a driving method according to this invention is applicable.

Referring to FIG. 11, the description will proceed to a second example of a driving apparatus 10B to which a driving method according to this invention is applicable. The driving apparatus 10B is similar in structure to the driving apparatus 10 illustrated in FIGS. 1 to 7 except that the vibration friction portion is modified from that illustrated in FIGS. 1 to 7 as will later become clear. The vibration friction portion is therefore depicted at 14A. FIG. 11 is similar to FIG. 6 and is a plan sectional view showing a placement relationship between the vibration friction portion 14A and the first and the second moving bodies 121 and 122.

Different from the vibration friction portion 14 illustrated in FIG. 6, the vibration friction portion 14A only has the V-shaped cross-sectional groove 141a at the first friction surface 141. Accordingly, the second friction surface 142 of the vibration friction portion 14 has a plane structure.

Specifically, although the moving member (the first and the second moving bodies 121 and 122) and the vibration friction portion 14 come into four lines contact with each other in the driving apparatus 10 comprising the vibration friction portion 14 illustrated in FIG. 6, the moving member (the first and the second moving bodies 121 and 122) and the vibration friction portion 14A come into three lines contact with each other in the driving apparatus 10B comprising the vibration friction portion 14A illustrated in FIG. 11.

In the diving apparatus 10B also, the first and the second moving bodies 121 and 122 are pressed against the vibration friction portion 14A by the spring 15 (see FIG. 1). As a result of this, inasmuch as the first and the second moving bodies 121 and 122 are pressed against the first V-shaped groove 141a and the second friction surface 142 of the vibration friction portion 14A, respectively, it is possible to make three parts (the first and the second moving bodies 121 and 122, and the vibration friction portion 14A) stable four lines contact.

In the manner which is described above, inasmuch as the vibration friction portion (the vibration member) 14A is sandwiched between the first and the second moving bodies 121 and 122 at both end surfaces thereof (the first V-shaped groove 141a formed in the first friction surface 141 and the second friction surface 142), it is possible to restrict a position of the lens movable portion and it is possible to prevent the lens movable portion from rotating around the first moving body 121. That is, it is possible to prevent the lens holder 17 serving as the driven member from rotating around the first moving body 121 as shown in an arrow of FIG. 11 without using any special (special-purpose) guide member.

In addition, in the example being illustrated also, it substantially makes equal a first coefficient of friction between the first moving body 121 and the first friction surface 141 of the vibration friction portion 14A and a second coefficient of friction between the second moving body 122 and the second friction surface 142 of the vibration friction portion 14A. In other words the materials of the first and the second moving bodies 121 and 122 are selected so that the first and the second coefficients of friction are substantially equal to each other. As a result, as shown in FIG. 11, it is possible to substantially make equal a first friction force acting at contact lines (two black circular points of left side in FIG. 11) between the first moving body 121 and the first friction surface 141 of the vibration friction portion 14A and a second friction force acting at a contact line (one black circular point of right side in FIG. 11) between the second moving body 122 and the second friction surface 142 of the vibration friction portion 14A. Thus, it is possible to linearly drive the lens movable portion with stability.

According to the driving apparatus 10B having such a structure, inasmuch as the first V-shaped groove 141a formed in the first friction surface 141 of the vibration friction portion 14A and the first moving body 121 come in two straight lines contact with each other and as the second friction surface 142 of the vibration friction portion 14A and the second moving body 122 come in one straight line contact with each other, advantages according to the driving apparatus 10B are that the frictionally coupled portions (the first and the second friction surfaces 141 and 142) are put into a stable contact state to obtain friction driving having good reproducibility, and it is possible to enhance rectilinear mobility of the moving member (the first and the second moving bodies 121 and 122) as a single-shaft mobile unit.

Although the V-shaped groove 141a is formed on the first friction surface 141 of the vibration friction portion 14A alone in the driving apparatus 10B illustrated in FIG. 11, conversely, the V-shaped groove may be formed on the second friction surface of the vibration friction portion alone.

The co-inventors experimentally ascertained that it is difficult to drive at broad frequency ranges by the driving method according to the above-mentioned first exemplary embodiment of this invention that merely applies, as the driving voltage, the rectangular wave voltage to the electro-mechanical transducer (the laminated piezoelectric element) 13 in the manner which will later be described in detail.

Thereupon, a driving method according to a second exemplary embodiment of this invention comprises repeatedly applying a driving voltage to the electro-mechanical transducer (the laminated piezoelectric element) 13 wherein the driving voltage comprises, for a period, a rectangular wave voltage of opposite polarity having a predetermined duty radio and a waiting or standby voltage of zero volt following to the rectangular wave voltage.

FIGS. 12A, 12B, 12C, 12D, 12E, and 12F show relationships between a frequency (kHz) and an operating speed (mm/s) when a waiting time interval Wait of the standby voltage is changed. Herein, the waiting time interval Wait is represented by a percent (%) when the period is equal to 100%. In the example being illustrated, a driving condition is a case where an absolute value of a maximum value of the voltage is equal to 2.8 volts and the predetermined duty factor is equal to 70/30.

In each of FIGS. 12A to 12F, the left shows an input waveform of the driving voltage applied to the electro-mechanical transducer (the laminated piezoelectric element) 13 while the right shows a view of characteristic of a driving frequency (kHz) vs. the operating speed (mm/s) of the lens movable portion. In addition, in the view of the characteristic in the right of each of FIGS. 12A to 12F, circular marks represent a speed in a direction that the lens moves downwards Down and rectangular marks represent a speed in a direction that the lens moves upwards Up.

Figure 12A:
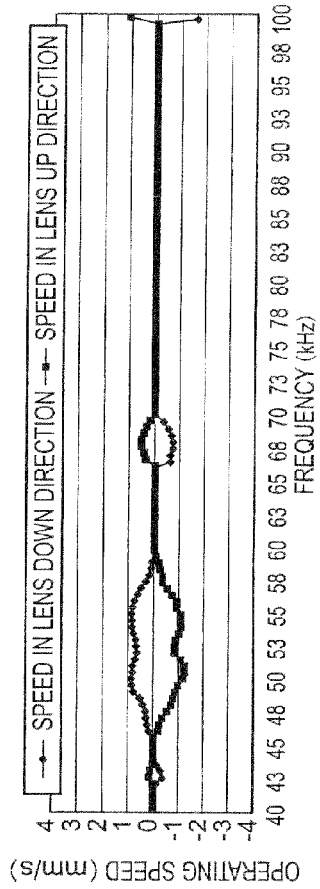
Figure 12A:
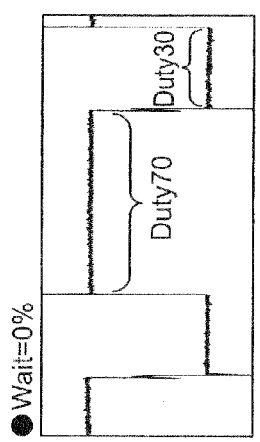

FIG. 12A shows the input waveform where the waiting time interval Wait is equal to 0% and the view of characteristic of the frequency vs. the operating speed. That is, FIG. 12A shows characteristic based on the driving method according to the first exemplary embodiment of this invention.

When the waiting time interval Wait of the driving voltage applied to the electro-mechanical transducer (the laminated piezoelectric element) 13 is equal to 0%, it is understood that there are two regions of 50 kHz to 55 kHz and 68 kHz as the operating frequency range as apparent from the view of characteristic of the right in FIG. 12A. However, the lens movable portion can only move at a narrower band in each of the two regions. In addition, a reversal phenomenon in a lens displacement direction occurs. This represents that the lens movable portion may move downwards Down or upwards Up in the same operating condition depending on the product.

Figure 12B:
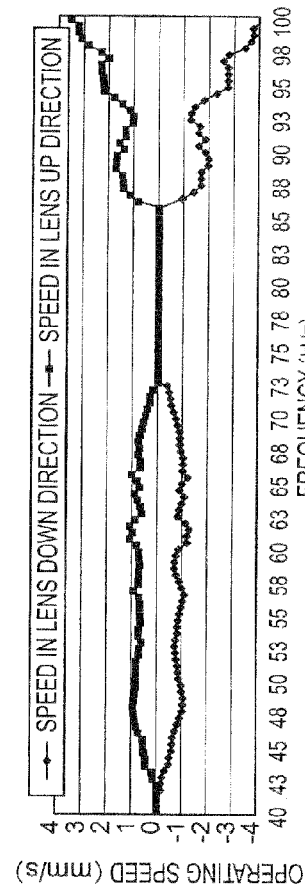
Figure 12B:
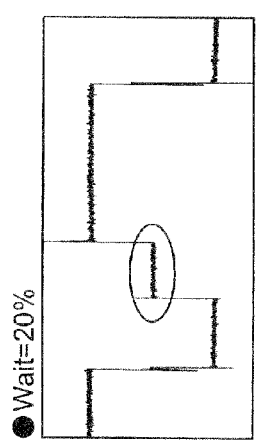
Figure 12C:
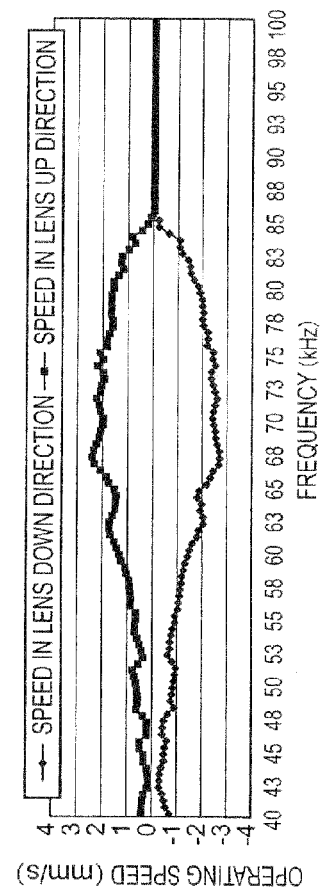
Figure 12C:
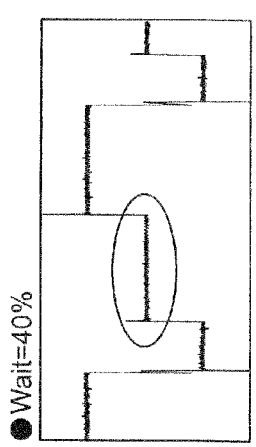

FIG. 12B shows the input waveform where the waiting time interval Wait is equal to 20% and the view of characteristic of the frequency vs. the operating speed. FIG. 12C shows the input waveform where the waiting time interval Wait is equal to 40% and the view of characteristic of the frequency vs. the operating speed. FIG. 12D shows the input waveform where the waiting time interval Wait is equal to 60% and the view of characteristic of the frequency vs. the operating speed. FIG. 12E shows the input waveform where the waiting time interval Wait is equal to 80% and the view of characteristic of the frequency vs. the operating speed. FIG. 12F shows the input waveform where the waiting time interval Wait is equal to 90% and the view of characteristic of the frequency vs. the operating speed. That is, FIGS. 12B to 12F show characteristics based on the driving method according to the second exemplary embodiment of this invention.

When the waiting time interval Wait of the driving voltage applied to the electro-mechanical transducer (the laminated piezoelectric element) 13 is equal to 20%, it is understood that there are two regions of 45 kHz to 70 kHz and 88 kHz or more as the operating frequency range as apparent from the view of characteristic of the right in FIG. 12B. Accordingly, it is possible to move the lens movable portion at a wider band in the two regions in comparison with FIG. 12A. In addition, a reversal phenomenon in a lens displacement direction is also improved.

When the waiting time interval Wait of the driving voltage applied to the electro-mechanical transducer (the laminated piezoelectric element) 13 is equal to 40%, it is understood that there is one region of 55 kHz to 83 kHz as the operating frequency range as apparent from the view of characteristic of the right in FIG. 12C. Accordingly, it is possible to move the lens movable portion at a wider band in the one region in comparison with FIG. 12A. In addition, a reversal phenomenon in a lens displacement direction is also improved.

When the waiting time interval Wait of the driving voltage applied to the electro-mechanical transducer (the laminated piezoelectric element) 13 is equal to 60%, it is understood that there are two regions of 58 kHz or less and 73 kHz to 75 kHz as the operating frequency range as apparent from the view of characteristic of the right in FIG. 12D. Accordingly, it is possible to move the lens movable portion at a wider band in the two regions in comparison with FIG. 12A. In addition, a reversal phenomenon in a lens displacement direction is also improved.

When the waiting time interval Wait of the driving voltage applied to the electro-mechanical transducer (the laminated piezoelectric element) 13 is equal to 80%, it is understood that there is one region of 65 kHz or more as the operating frequency range as apparent from the view of characteristic of the right in FIG. 12E. Accordingly, it is possible to move the lens movable portion at a wider band in the one region in comparison with FIG. 12A. In addition, a reversal phenomenon in a lens displacement direction is also improved.

When the waiting time interval Wait of the driving voltage applied to the electro-mechanical transducer (the laminated piezoelectric element) 13 is equal to 90%, it is understood that there are two regions of 80 kHz or less and 94 kHz or more as the operating frequency range as apparent from the view of characteristic of the right in FIG. 12F. Accordingly, it is possible to move the lens movable portion at a wider band in the two regions in comparison with FIG. 12A. In addition, a reversal phenomenon in a lens displacement direction is also improved.

In the manner which is described above, it is possible to drive the lens movable portion at a wider band by setting the waiting time interval where the standby voltage is equal to zero volt. As a result, it is possible to suppress the unevenness of the driving condition every product. In addition inasmuch as it is possible to suppress the reversal phenomenon in the lens displacement direction, it is possible to drive the lens movable portion with stability. The longer the waiting time interval of the standby voltage of zero volt becomes, the smaller power consumption in the driving apparatus 10 will be.

In addition, in the above-mentioned second exemplary embodiment of the present invention, the description is exemplified in a case where the predetermined duty factor is equal to 70/30, However, the co-inventors experimentally ascertained that it is possible smoothly move the lens movable portion (the moving member) when the predetermined duty ratio lies in a range between 75/25 and 65/35, In addition, although the description is exemplified in a case where the waiting time interval of the standby voltage lies in a range between 20% and 90% in one period in the above-mentioned second exemplary embodiment of the present invention, as a matter of course, the waiting time interval of the standby voltage is not limited to them.

In a first exemplary aspect of this invention, the driving method may comprise applying a rectangular wave voltage to the electro-mechanical transducer to subject the electro-mechanical transducer to displacement in the sawtooth waveform. The rectangular wave voltage may desirably have a duty ratio which lies in a range between 75/25 and 65/35, both inclusive. More preferably, the duty ratio may be substantially equal to 70/30.

In a second exemplary aspect of this invention, the driving method may comprise repeatedly applying a driving voltage to the electro-mechanical transducer. The driving voltage may comprise, for a period, a rectangular wave voltage of opposite polarity having a predetermined duty radio and a standby voltage of zero volt following to the rectangular wave voltage, thereby subjecting the electro-mechanical transducer to displacement in the sawtooth wave. The predetermined duty ratio may desirably lie in a range between 75/25 and 65/30, both inclusive. More preferably, the predetermined duty ratio may be substantially equal to 70/30, The standby voltage has a waiting time interval in a predetermined percent of the period. The predetermined percent may desirably lie in a range between 20% and 90% both inclusive. More preferably, the predetermined percent may be substantially equal to 90%.

An exemplary advantage according to the invention is that it is possible to linearly drive the moving member in a predetermined direction smoothly. This is because the driving method comprises subjecting the electro-mechanical transducer to reciprocating displacement in a sawtooth waveform and transferring the reciprocating displacement of the electro-mechanical transducer to the vibration friction portion through the vibration transfer member.

While this invention has been particularly shown and described with reference to exemplary embodiments thereof, the invention is not limited to these embodiments. It will be understood by those of ordinary skill in the art that various changes in form and details may be therein without departing from the spirit and scope of the present invention as defined by the claims. For example, although each of the first and the second moving bodies has a cylindrical shape in the above-mentioned exemplary embodiments, as a matter of course, the shape of the first and the second moving bodies may not be restricted to this. In addition although the vibration friction portion has a complicated shape (an odd shape) in the above-mentioned exemplary embodiments the vibration friction portion may have a cylindrical shape (a rod shape).

What is claimed is:

1. A driving method for a driving apparatus which comprises an electro-mechanical transducer having a first end surface and a second end surface opposite to each other in an expansion/contraction direction, a vibration friction portion mounted to the second end surface of said electro-mechanical transducer, said vibration friction portion having a V-shaped groove in cross section, a moving member frictionally coupled to said vibration friction portion, said moving member including first and second rod-shaped moving bodies which sandwich said vibration friction portion therebetween at the V-shaped groove thereof, and a vibration transfer member disposed between the second end surface of said electro-mechanical transducer and an end surface of said vibration friction portion, said driving method driving said moving member due to expansion/contraction of said electro-mechanical transducer so as to move said moving member in the expansion/contraction direction of said electro-mechanical transducer, said driving method comprising:

subjecting said electro-mechanical transducer to reciprocating displacement in a sawtooth waveform; and transferring the reciprocating displacement of said electro-mechanical transducer to said vibration friction portion through said vibration transfer member, thereby linearly driving said moving member in a predetermined direction.

2. The driving method as claimed in claim 1, further comprising applying a rectangular wave voltage to said electro-mechanical transducer to subject said electro-mechanical transducer to displacement in the sawtooth waveform.

3. The driving method as claimed in claim 2, wherein the rectangular wave voltage has a duty ratio which lies in a range between 75/25 and 65/35, both inclusive.

4. The driving method as claimed in claim 3, wherein the duty ratio is substantially equal to 70/30.

5. The driving method as claimed in claim 1, further comprising repeatedly applying a driving voltage to said electro-mechanical transducer, the driving voltage comprising, for a period, a rectangular wave voltage of opposite polarity having a predetermined duty ratio and a standby voltage of zero volts following the rectangular wave voltage, thereby subjecting said electro-mechanical transducer to displacement in the sawtooth wave.

6. The driving method as claimed in claim 5, wherein the predetermined duty ratio lies in a range between 75/25 and 65/30, both inclusive.

7. The driving method as claimed in claim 6, wherein the predetermined duty ratio is substantially equal to 70/30.

8. The driving method as claimed in claim 5, wherein the standby voltage has a waiting time interval in a predetermined percent of said period.

9. The driving method as claimed in claim 8, wherein the predetermined percent lies in a range between 20% and 90%, both inclusive.

10. The driving method as claimed in claim 9, wherein the predetermined percent is substantially equal to 90%.

\* \* \* \* \*